US012607643B2

(12) United States Patent
Shah et al.

(10) Patent No.: US 12,607,643 B2
(45) Date of Patent: Apr. 21, 2026

(54) LABORATORY SLIDE HEATER

(71) Applicant: Rushabh Instruments, LLC, Ivyland, PA (US)

(72) Inventors: Preyas Shah, Ivyland, PA (US); Sahil Shah, Ivyland, PA (US)

(73) Assignee: Rushabh Instruments, LLC, Ivyland, PA (US)

( * ) Notice: Subject to any disclaimer, the term of this patent is extended or adjusted under 35 U.S.C. 154(b) by 695 days.

(21) Appl. No.: 18/072,892

(22) Filed: Dec. 1, 2022

(65) Prior Publication Data

US 2024/0183868 A1     Jun. 6, 2024

(51) Int. Cl.
G01N 35/00          (2006.01)

(52) U.S. Cl.
CPC .................. G01N 35/00029 (2013.01); G01N 2035/00138 (2013.01); G01N 2035/00346 (2013.01)

(58) Field of Classification Search
None
See application file for complete search history.

(56) References Cited

U.S. PATENT DOCUMENTS 7,273,591 B2 * 9/2007 Sellers ............. G01N 35/00029
                                                   422/563

* cited by examiner

*Primary Examiner* — Jyoti Mutreja
(74) *Attorney, Agent, or Firm* — Buchanan Ingersoll & Rooney PC

(57) ABSTRACT

A laboratory slide heater includes a housing having an interior region defining a plurality of stations and an open end; a plurality of movable covers at least partially concealing the open end of the interior region; and a heater positioned to deliver heat into the interior region for heating one or more of the plurality of stations. Each movable cover is positioned to provide access to one station of the plurality of stations. The stations may be arranged in a circular fashion on a rotatable platform for drying purposes.

19 Claims, 11 Drawing Sheets

LABORATORY SLIDE HEATER

FIELD OF THE INVENTION

The present invention relates to a laboratory slide heating system.

BACKGROUND OF THE INVENTION

As is described in U.S. Pat. No. 10,520,403, which is incorporated by reference herein in its entirety and for all purposes, horizontal hotplates and ovens are often used to heat and dry wet laboratory slides. Described herein is an automated dryer for laboratory slides.

SUMMARY OF THE INVENTION

According to one aspect, a laboratory slide heater includes a housing having an interior region defining a plurality of stations and an open end; a plurality of movable covers at least partially concealing the open end of the interior region; and a heater positioned to deliver heat into the interior region for heating one or more of the plurality of stations. Each movable cover is positioned to provide access to one station of the plurality of stations.

According to another aspect, a laboratory slide heater includes a housing defining an interior region. A platform is positioned within the interior region and defines a plurality of stations, each station being sized to accommodate a carriage holding one or more laboratory slides. The plurality of stations are arranged in a circular fashion. A motor is configured to rotate the platform for removing liquid from the slides. A heating means is positioned to deliver heat into the interior region for heating at least one of the stations and the one or more laboratory slides accommodated at that station at a predetermined temperature.

BRIEF DESCRIPTION OF THE DRAWINGS

The invention is best understood from the following detailed description when read in connection with the accompanying drawings. It is emphasized that, according to common practice, the various features of the drawings are shown schematically and may not be to scale. Included in the drawings are the following figures.

DETAILED DESCRIPTION OF THE INVENTION

Figure 1:
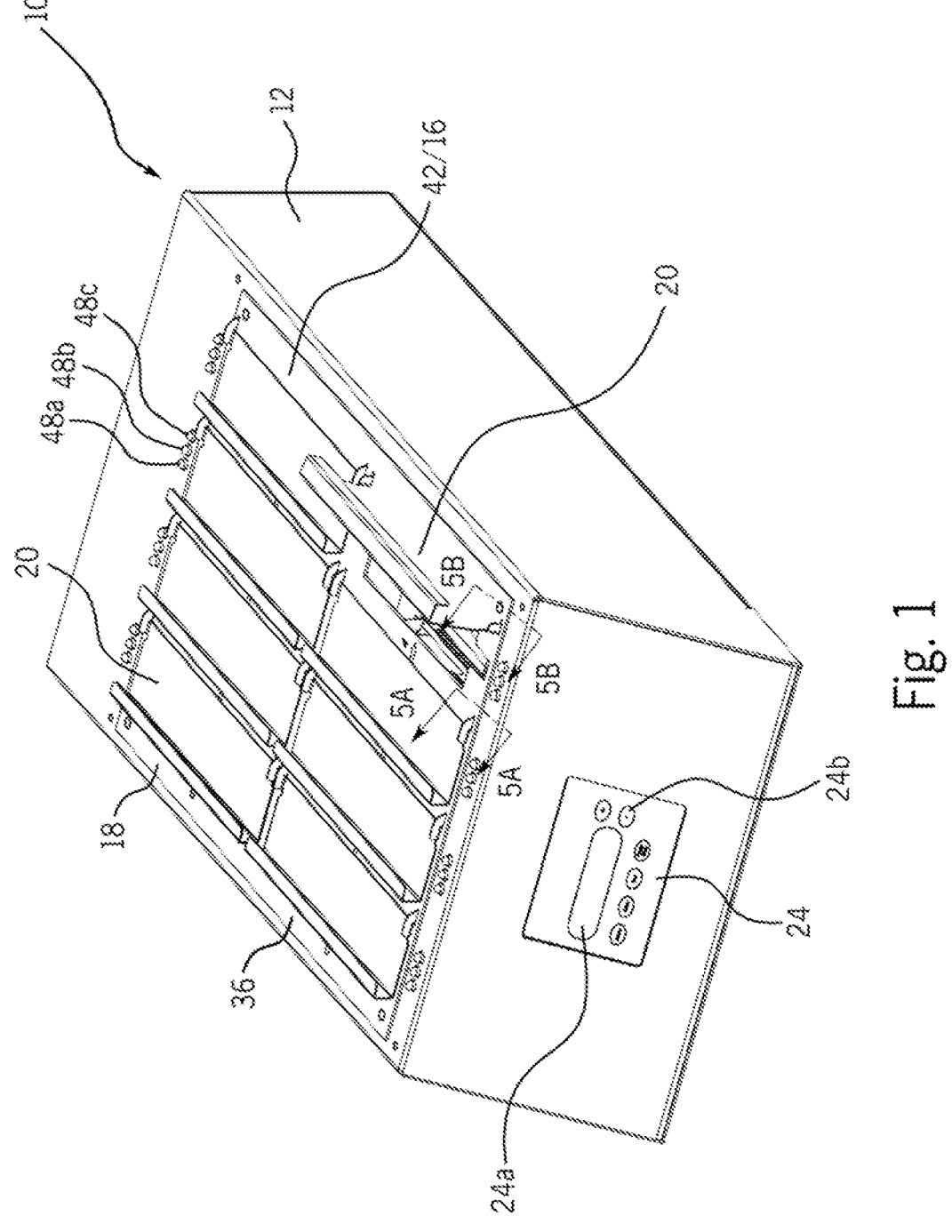
FIG. 1 depicts an isometric view of a slide heater according to one exemplary embodiment of the invention.
Figure 2:
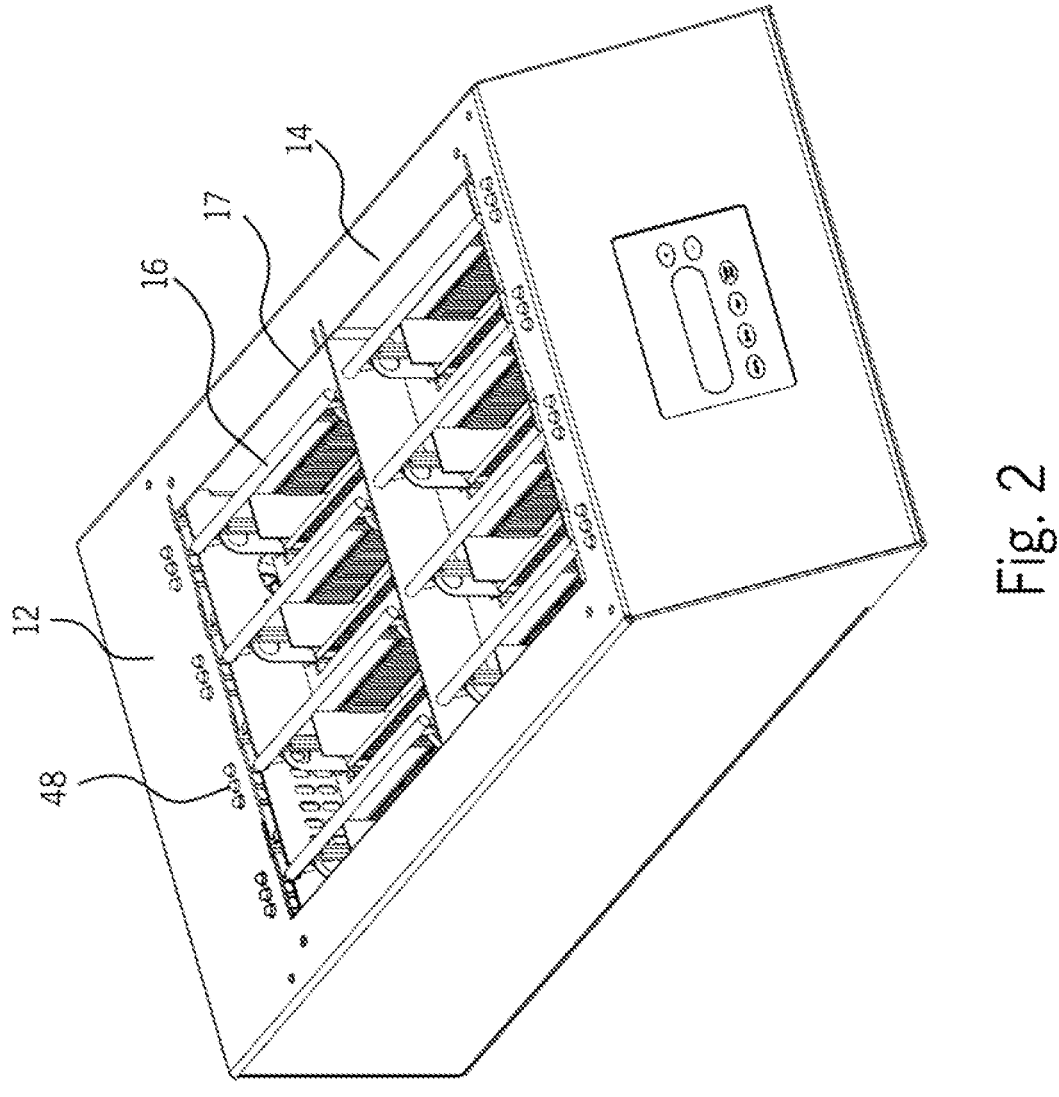
FIG. 2 depicts an isometric view of the heater of FIG. 1 with the door assembly removed.

The invention will next be illustrated with reference to the figures. Such figures are intended to be illustrative rather than limiting and are included herewith to facilitate explanation of the present invention. In the drawing figures, like item numbers refer to like elements throughout. When a plurality of similar elements is present, a single reference numeral may be assigned to the plurality of similar elements with a capital letter designation referring to specific elements. When referring to the elements collectively or to a non-specific element, the letter designation may be omitted.

In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

FIGS. 1-4 depict a slide heater 10 (referred to herein as heater 10) in various stages of assembly. Heater 10 may also be referred to in the art as a slide warmer, slide dryer, or oven, for example. Heater 10 may be for use in cytology, histology, pathology, and biology for paraffin tissue section mounting, for example.

Heater 10 generally includes a housing 12 defining a hollow interior region 14 (also referred to herein as a chamber 14) for accommodating a plurality (e.g., eight) removable laboratory slide carriage assemblies 16; a door assembly 18 mounted atop the region 14 and having a plurality (e.g., eight) moveable doors 20 for at least partially concealing the interior region 14; a heating means 22 positioned adjacent the interior region 14; a user interface 24 for controlling operation of heater 10; and a processor/controller 26 (shown schematically) for operating the heater 10 in an automated fashion.

Turning now to the individual components of heater 10, housing 12 includes an internal frame and outer shell positioned over the internal frame. The remaining components of heater 10 are coupled either directly or indirectly to housing 12. Hollow interior region 14 is sized to accommodate a plurality (e.g., eight) removable laboratory slide carriage assemblies 16, however, the size of interior region 14 can vary to accommodate any number of assemblies 16. The interior spaced defined by hollow interior region 14 is divided into (eight) different stations, whereby each station accommodates a single slide carriage assembly 16.

The floor 28 of region 14 includes a plurality (e.g., eight) recessed areas 30 in the form of depressions. Each area 30 is associated with a different station. Each recessed area 30 is sized to receive a single collection tray 32 associated with a slide carriage assembly 16. Hollow interior region 14 has an open end 17 opposite the floor 28.

Although not shown, the walls of region 14 may constitute a fluid containing tray (with modification), or a fluid containing tray may be positioned within region 14.

Figure 3:
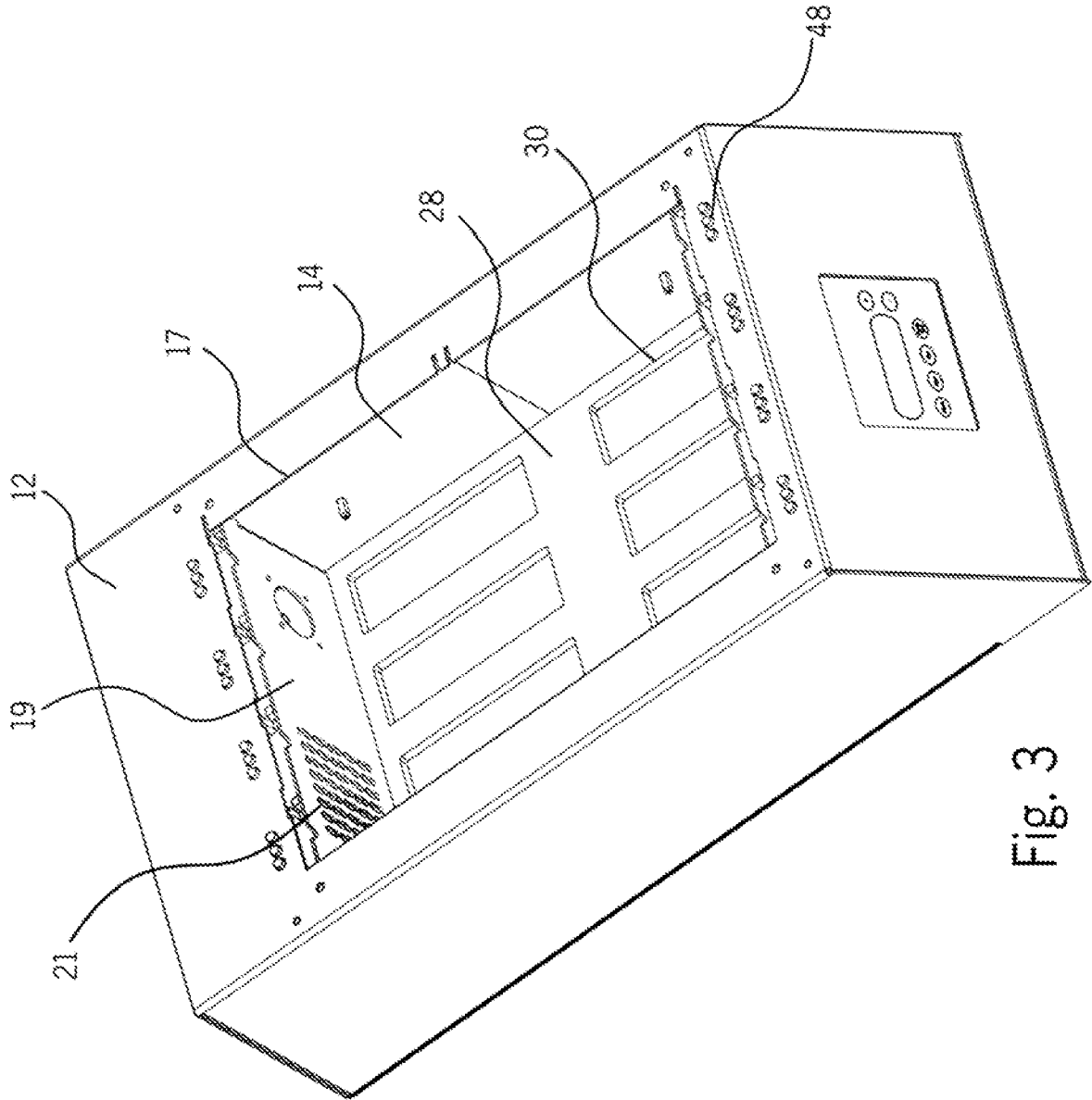
FIG. 3 depicts an isometric view of the heater of FIG. 2 with the slide carriages removed.
Figure 4:
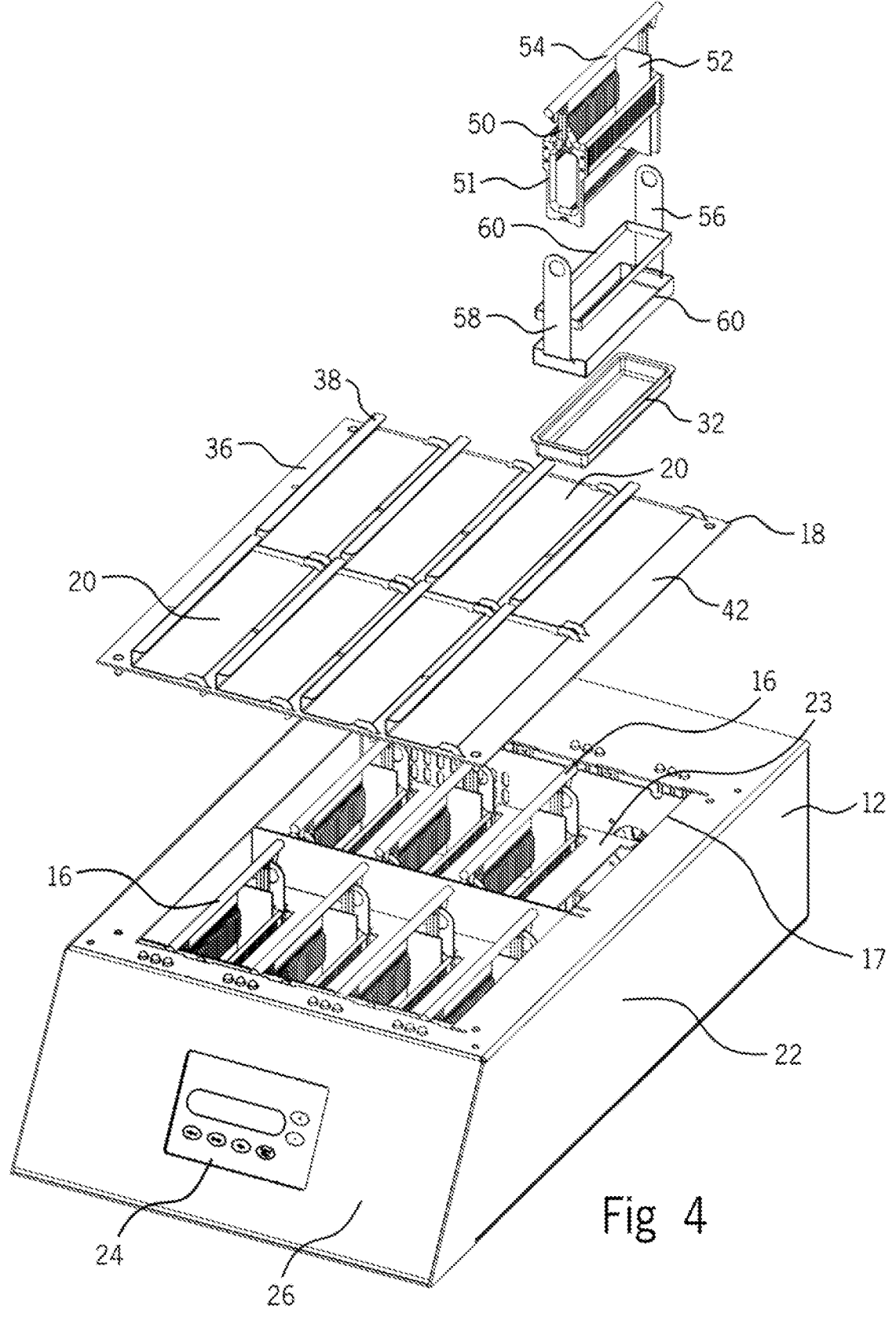
FIG. 4 depicts a partially exploded view of the slide heater of FIG. 1.

Heating means 22 may comprise one or more heaters and fans that are configured to direct heated air (produced by the heaters) over the slides thereby drying the slides by convection. As best shown in FIG. 3, the heater(s) and fan(s) may be positioned behind wall 19 of housing 12, and that wall 19 may include apertures 21 for directing the heated air into chamber 14. Alternatively, heating means 22 may comprise a heated plate that is positioned beneath the floor 28. Heating means 22 may heat the entire interior region 14 to the same temperature.

Figure 7:
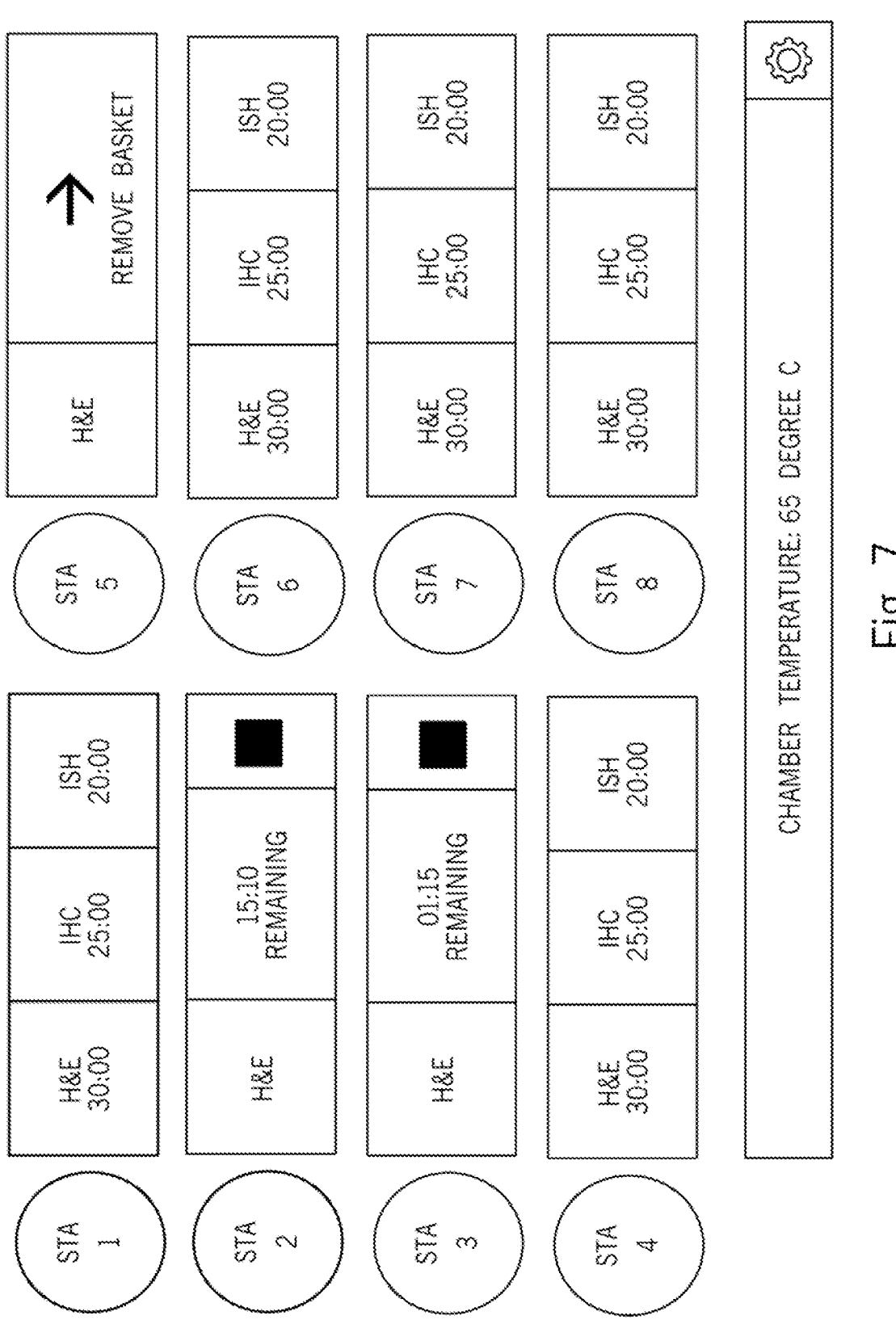
FIG. 7 depicts a touchscreen display for the slide heater of FIG. 1.

User interface 24 comprises an alphanumerical display 24a and a series of depressible buttons 24b for inputting information and/or instructions into the processor 26. Alternatively, the buttons may be incorporated into a single touch-sensitive display having user selectable icons, as shown in FIG. 7. User interface 24 is electrically connected to processor 26 for transmitting signals therebetween.

Computer processor 26 is electrically connected to at the least the following components for sending signals and/or power therebetween: user interface 24, heating means 22, a plurality of door sensors 34, one or more temperature sensors for determining the temperature within region 14, an audio speaker, a power supply and more. Processor/controller 26 may include a memory and a clock (for timing functions). Processor/controller 26 may also be referred to as a computer.

Door assembly 18 is removably positioned atop open end 17 of housing 12 to at least partially conceal that open end. Door assembly 18 includes a rectangular door frame 36 including a plurality (e.g., eight) rectangular openings, and a door 20 that is moveably mounted to each opening. Each door 20 is associated with a particular heating station of the heater 10. Door 20 includes a handle 38 so that a user can pivot the individual door 20 about its hinge. Each door 20 moves between an open position and a closed position. One door 20 is shown in the open position in FIG. 1, and the remaining doors 20 are shown closed in that figure. The doors 20 may also be referred to herein as movable covers.

Figure 5B:
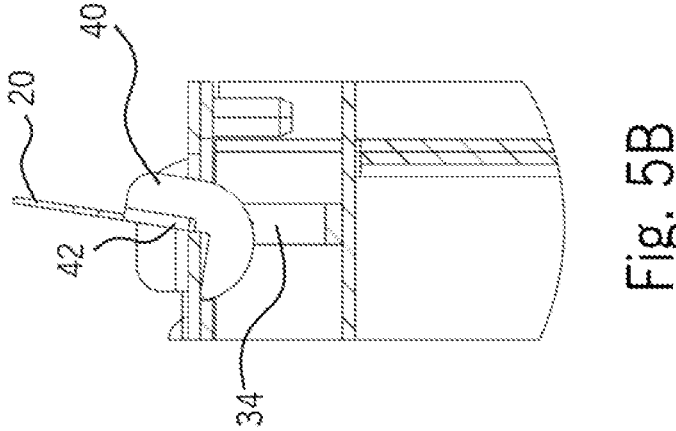
FIG. 5B depicts a cross-sectional view of the slide heater of FIG. 1 taken along the lines 5B-5B, which shows a sensor capable of sensing the presence of the door, which indicates that the door is open.
Figure 5A:
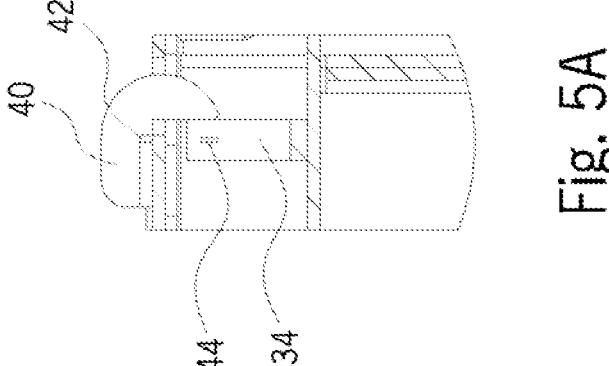
FIG. 5A depicts a cross-sectional view of the slide heater of FIG. 1 taken along the lines 5A-5A, which shows a sensor capable of sensing the absence of the door, which indicates that the door is closed.
Figure 6:
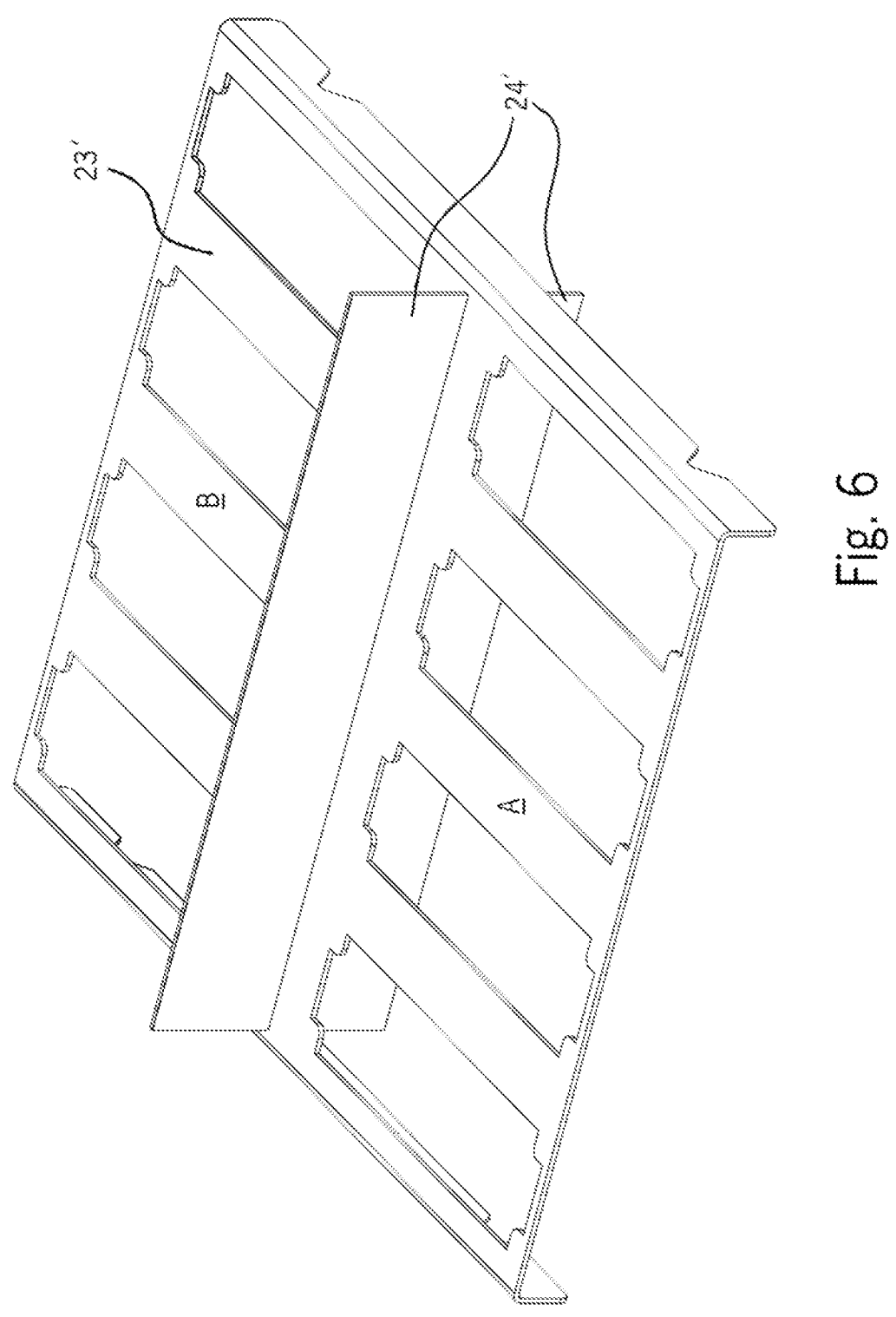
FIG. 6 depicts an alternative tray that can be used to convert the chamber of the slide heater into multiple sub-chambers.

As best shown in FIGS. 5A and 5B, each door 20 includes a door segment 40, which is positioned adjacent the hinge 42, that interacts with one of the door sensors 34. In the open position of the door 20 shown in FIG. 5A, a sensitive element 44 of the sensor 34 does not sense the presence of the segment 40. Accordingly, processor 26 recognizes that door 20 is closed. In the closed position of the door 20 shown in FIG. 5B, the sensitive element 44 of sensor 34 senses the presence of the segment 40. Accordingly, processor 26 recognizes that door 20 is open. Processor 26 can separately track the open/closed positions of all eight doors 20. Sensor 34 may be an optical sensor, a magnetic sensor, a pressure sensor, a mechanical sensor having a wiper, or any other type of proximity sensor known to those skilled in the art.

Doors 20 are arranged in two separate rows, whereby each row has four separate doors 20. The hinge axis 46 of one row is aligned with the hinge axis 46 of the other row. Indicia (e.g., 1, door 1, A, door A) may be printed on each door 20 to designate that door from the other doors. Alternatively, the indicia may be printed on the frame 36 at a location adjacent each door 20.

A tray 23 is positioned within chamber 14. Tray 23 has a series of (eight) openings that register with respective doors 20 and recessed areas 30. Each opening in the tray 23 is sized to receive one of the slide carriages 16.

A set of three colored light indicators 48 are positioned on the housing 12 adjacent each door 20. Light indicators 48 may be light emitting diodes (LEDs), for example. Heater 10 includes eight different sets of indicators yielding a total of 24 indicators 48. Each set of indicators 48 indicate the operational status of a particular station of heater 10. A first indicator 48a of the set may be colored red to indicate (when illuminated) that a heating operation is in progress, thereby indicating to a user that the door should not be opened. A second indicator 48b of the set may be yellow to indicate (when illuminated) that a heating operation has ended and the slide carriage 16 should be removed. A blinking indicator 48b indicates that user attention is needed (e.g., a user opened the door before a station run was completed, or the unit lost power before the station run was completed). A third indicator 48c of the set may be green to indicate (when illuminated) that a station is available and can be filled with a carriage assembly 16. It should be understood that the number, color and placement of the indicators can vary. Also, in lieu of indicators 48, the operational status of each station may be indicated on the display 24a. As another alternative, each station may have only a single multi-colored indicator that is capable of displaying red, yellow and green colors.

Each slide carriage assembly 16 includes a carriage 50 including a frame 51 having slotted side and lower walls for releasably receiving one or more laboratory slides 52. A handle in the form of rod 54 is mounted to the top end of the frame. Rod 54 extends parallel to hinge axis 46. Frame 51 has open side walls so that the convected air can contact the slides 52. A carriage carrier 56 is mounted to frame 51. Carrier 56 includes two side walls 58 each having an aperture for receiving rod 54 and two rectangular bands 60 interconnecting the two side walls 58. A removable tray 32 is mounted to the bottom of carrier 56 at an elevation beneath slides 52 for collecting any fluid that drips from slides 52. Tray 32 may be either removably or fixedly mounted to carrier 56. Also, tray 32 may not be considered as forming part of a slide carriage assembly 16. Carrier 56 is an optional component that may be omitted, if so desired.

Alternatively, the vertical walls of tray 32 may be higher to form a fluid container in which the entire carrier 56 and its slides 52 are positioned. Fluid, such as liquid or air, may be present in that container.

Referring now to one exemplary method of using heater 10, using buttons 24b and display 24a, a user enters time durations for three different timer options. The three different timer options may be hematoxylin and eosin histology (H&E), Immunohistochemistry (IHC) and In situ hybridization (ISH). For example, a user may enter a time duration of 10 minutes, 8 minutes and 3 minutes for those three timer options, respectively. The user then sets the temperature for the chamber 14 between 40° C. and 70° C. Although this information is entered prior to installing the slide carriage assemblies 16, the user can also enter this information after a slide carriage assembly 16 has been loaded into a station.

Once the time durations for the three timers and the desired temperature set point of the dryer are set by the user, the dryer 10 is ready to heat the slide carriage assemblies 16 as per the end user's selections. The user will open a door 20 of one empty station that has an illuminated green indicator 48c. Once the door 20 is open, the door sensor 34 communicates the open status to the processor 26. The user then installs a slide carriage assembly 16 at that station and closes the door 20. Once the door 20 is closed, the door sensor 34 communicates the closed status to the processor 26. The user interface 24 will prompt the user to select the timer option for that station. The user uses buttons 24b to select the desired timer option (i.e., H&E, IHC, or ISH) and then start the timer. Alternatively, the user could simply enter a heating time (e.g., 9 minutes). The indicator 48a at that station will illuminate red once the timer has started and while the station is being heated and will remain red until the timer for that station has elapsed. Once the timer has elapsed, the indicator 48a will deactivate and the indicator 48b will illuminate yellow. If heater 10 includes separate heaters for each station, processor 26 will deactivate the heater assigned to that station once the time has elapsed. An audio speaker of dryer 10 will beep and continue to beep periodically whenever a station timer has completed and the slide carriage assembly 16 has not yet been removed from its station. Once the user opens the door 20 of the station (as sensed by door sensor 34 and communicated to processor 26), indicator 48c will illuminate green. The user can remove the slide carriage assembly 16 (either with or without carriage carrier 56). Before closing door 20, user can load another slide carriage assembly 16 if so desired. Door 20 is then closed by the user.

If a door 20 of a station were inadvertently opened before the processing (heating) time had elapsed, processor 26 would pause the timer for that station.

It should be understood that it is possible to set different timers for the individual stations (i.e., eight different timers).

Heater 10 includes a single chamber 14 and a single heating means 22. Alternatively, heater 10 may include (i) a plurality of independently controllable heating means 22 and/or (ii) a different tray 23' (also referred to herein as a divider) having dividing walls 24' that divide heating chamber 14 into multiple sub-chambers. One heating means 22 would be responsible for heating one of the sub-chambers, and the other heating means 22 would be responsible for heating the other sub-chamber. The separate heating means 22 may comprise separate heating plates or separate fans, for example. It should be understood that tray 23' would replace tray 23.

Tray 23' divides the chamber 14 into two sub-chambers A and B. For example, sub-chamber A would be responsible for heating the carriages docked at stations 1-4, whereas the other sub-chamber B would be responsible for heating the carriages docked at stations 5-8. In such an example, the temperature in sub-chambers A and B can be independently controlled using the separate and independently controllable heating means 22.

As another alternative, to further increase the number of independently heated sub-chambers, further independently controlled heating means 22 may be added to heater 10, and more dividing walls 24' may be added to tray 23'. For example, heater 10 could include a total of eight independently heated sub-chambers, i.e., one independently heated sub-chamber for each carriable assembly 16.

It is to be understood that the operational steps described herein are performed by the processor 26 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the processor described herein is implemented in software code or instructions which are tangibly stored on a tangible computer readable medium. Upon loading and executing such software code or instructions by the processor, the processor may perform any of the functionality of the processor described herein, including any steps of the methods described herein.

Turning now to FIG. 7, as noted above, heater 10 may include a single touch-sensitive display having user selectable icons. The previously described indicators 48 as well as sensors 34 may (or may not) be omitted if heater 10 includes the display. Heater includes eight stations labeled STA_1 though STA_8.

In the example shown in FIG. 7, the icons for stations 1, 4 and 6-8 may be displayed in green (for example) indicating that those stations are empty and ready to receive (and process) a slide carriage assembly 16. Once those empty stations are loaded with a slide carriage assembly 16 (or even prior to loading), the user may select one of the timer option icons (i.e., H&E, IHC or ISH) that are included on the display.

In the example shown, stations 2 and 3 are in the course of a heating/processing protocol. The heating/processing protocol (i.e., H&E, as shown) as well as the remaining processing/heating time is displayed beside the respective station icons. The icons for the stations currently undergoing heating/processing may be displayed in red. The small box to the right of the remaining time may be selected to cancel a particular timer.

In the example shown, heating/processing at station 5 is complete and the slide carriage assembly 16 at station 5 may be removed. The text 'Remove Basket' may be displayed beside the station number thereby indicating to the user that the heating timer has elapsed and the carriage assembly 16 docked at that station may be removed. The icons for the stations in which heating/processing is complete may be displayed in yellow. Once the user selects Remove Basket icon, the station icon turns green.

The user can set and/or modify the chamber temperature by selecting the gear icon in the lower right side of the display. The set chamber temperature (e.g., 65 degrees C.) is displayed. Further modifications may be made by selecting the gear icon, such as changing the timer options (e.g., changing the IHC timer from 25 minutes to 20 minutes).

Figure 8:
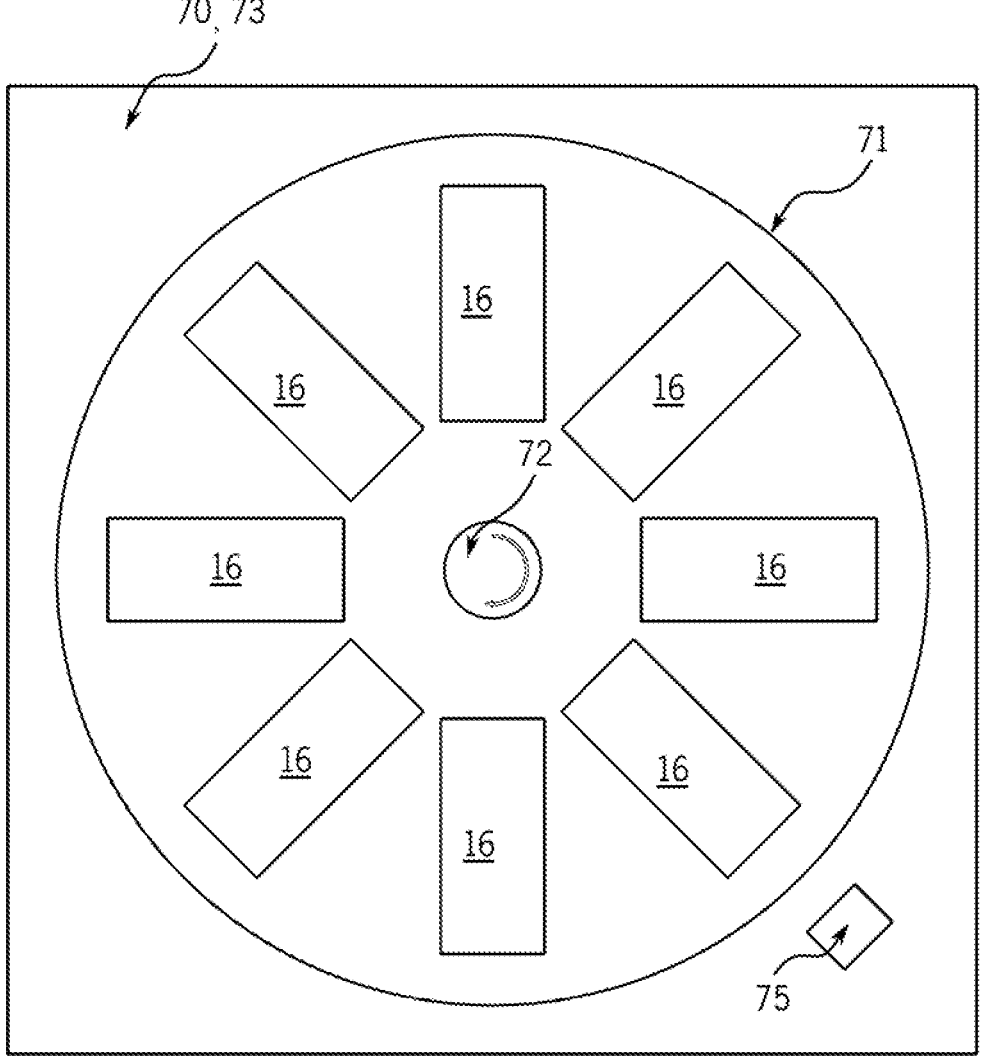
FIG. 8 depicts a schematic view of a slide heater according to a second embodiment.

Turning now to FIG. 8, depicted is another embodiment of a slide heater 70. All of the details of heater 10 apply to heater 70, except as described hereinafter. In this embodiment, the carriage assemblies 16 are positioned in a circular arrangement and on a rotatable platform 71 that is positioned within an interior region of a housing 72. The rotatable platform 71 is rotated (see directional arrow) by a motor 72. Motor 72 may be positioned beneath the platform. Motor 72 is used to spin the carriage assemblies 16 to remove liquid from the slides on those carriage assemblies 16 at a faster rate (as compared with no spinning action). A drain port may be provided at or near the boundary of platform 71 for draining purposes. Platform 71 may reside in the interior region (like interior region 14) of heater 70. It should be understood that the doors of the door assembly (not shown) for heater 70 are positioned above the respective carriage assemblies 16 to register with respective carriage assemblies 16 for access purposes. Door assembly may rotate along with the rotatable platform, or, alternatively, door assembly may be stationary. If door assembly is stationary, then a rotation sensor 75 (e.g., Hall-Effect, potentiometer, etc.) may be provided to track the rotational position of platform 71 to ensure, for example, that the position of carriage assemblies 16 registers with their respective stationary doors. Sensor 75 may be provided even if door assembly rotates along with platform 71. Although not shown, the housing 73 of heater 70 may or may not have a circular shape to compliment the circular shape of the rotatable platform.

Figure 9:
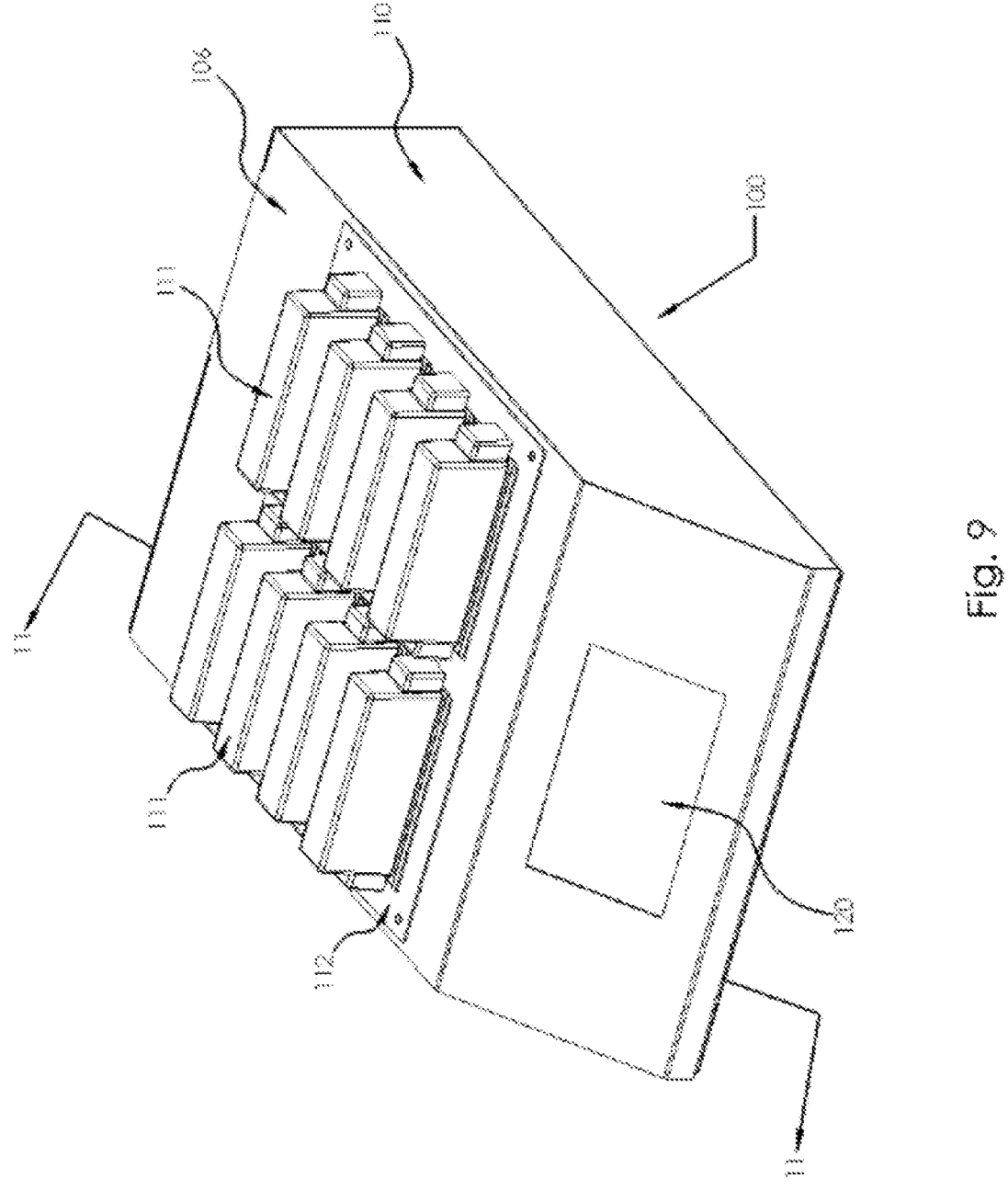
FIG. 9 depicts an isometric view of a fully-assembled slide heater, according to a third embodiment.
Figure 10:
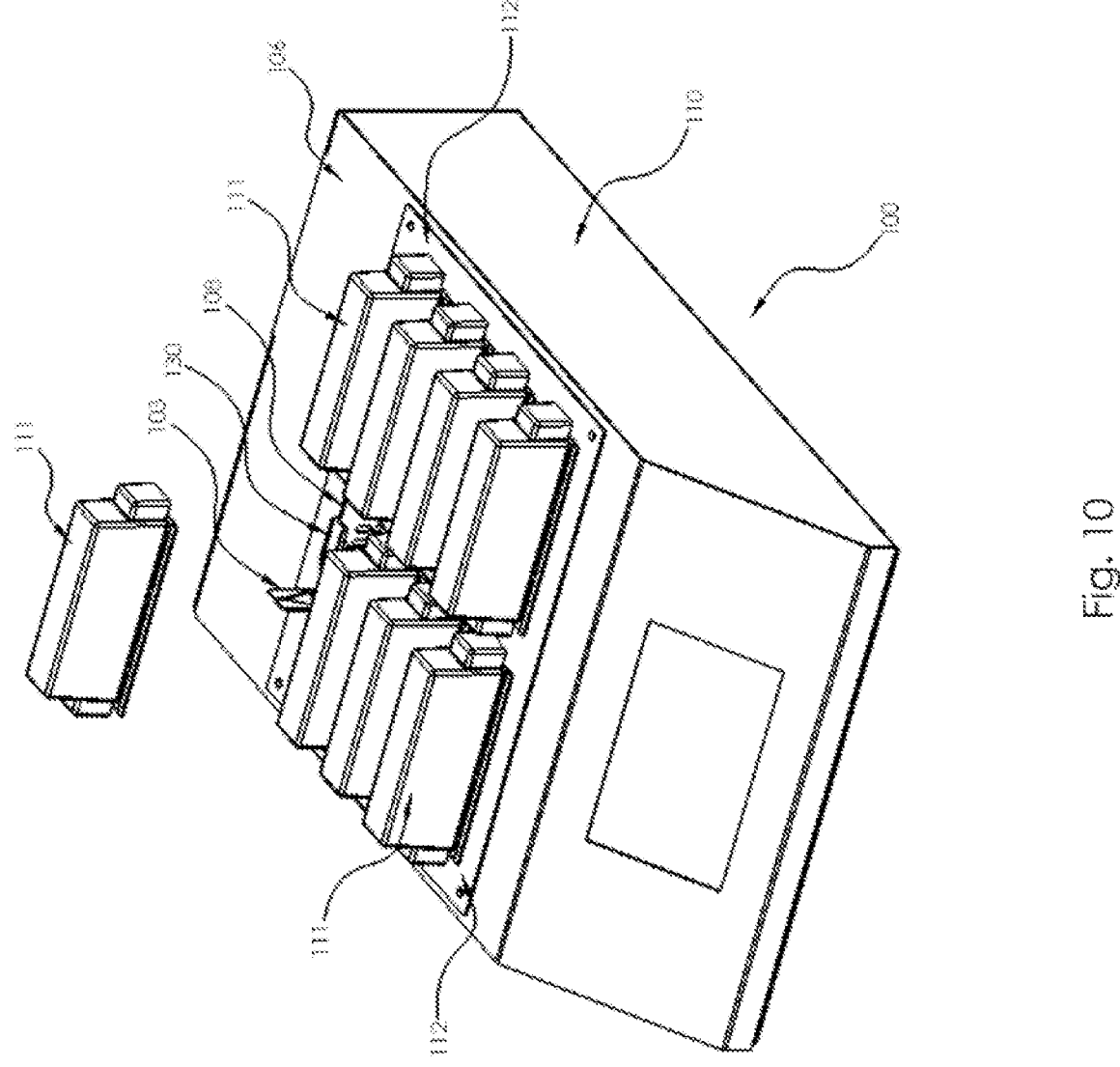
FIG. 10 depicts another isometric view of the slide heater of FIG. 9, wherein one of the covers is shown exploded away from the slide heater.
Figure 11:
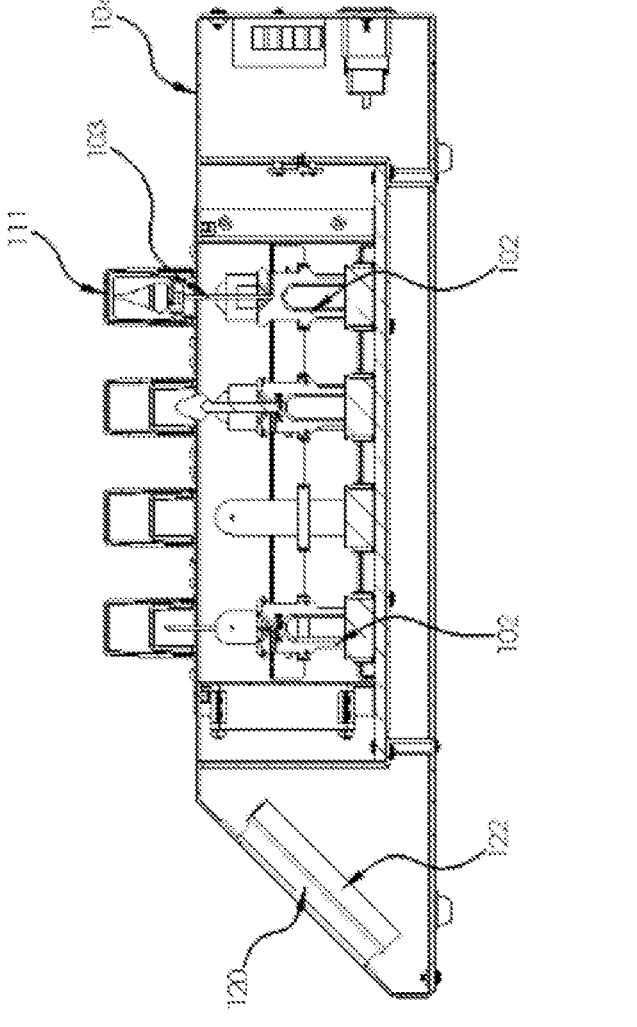
FIG. 11 depicts a cross-sectional view of the heater of FIG. 9 taken along the lines 11-11.

Turning now to FIGS. 9-11, depicted is yet another embodiment of a slide heater 100. All of the details of heater 10 apply to heater 100, except as described hereinafter. In this embodiment, the carriage assemblies 102 (analogous to carriage assemblies 16 in FIG. 2) are rotated ninety degrees relative to the carriage assemblies 16 of FIG. 2. Each carriage assembly 102 resides in a station of heater 100. A user handle 103 of each carriage assembly 102 extends to an elevation above a top surface 106 of the outer housing 110 of heater 100 such that handles 103 protrude from housing 110.

A divider 112 is arranged on top surface 106 of housing 110. Divider 112 includes a series of openings 108 (eight openings in this embodiment) that delineate the various stations at which carriage assemblies 102 may be docked. Each opening 108 is sized to receive a carriage assembly 102.

Each opening 108 is covered by a moveable cover 111. It should be understood that removing cover 111 at a particular station provides access to a respective carriage assembly 102 that is docked at that station. Conversely, adding cover 111 to a station prevents heat from escaping through the opening(s) 108 at that station.

Each cover 111 (eight shown) comprises an elongated hollow body. The hollow region of the body is sized to accommodate the portion of the handle 103 that resides above top surface 106 of housing 110.

Heater 100 includes a human machine interface (HMI) in the form of a touchscreen 120 that is positioned on the angled front face of housing 110. The HMI can differ from that which is shown. A computer controller/processor 122 is mounted to rear side of touchscreen 120 at a location within the interior of housing 110, as shown in FIG. 11.

Although not necessarily required, a sensor 130 may be positioned at or near each opening 108 for sensing either the presence or absence of a cover 111 that is mounted at that opening. Each opening 108 may have its own sensor 130.

While exemplary embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A laboratory slide heater comprising:
a housing having an interior region defining a plurality of stations, open end, and a floor opposite the open end;
a plurality of independent carriage carriers each having an open frame for holding a plurality of laboratory slides in a vertical orientation, each carriage carrier being independently accommodated in one station of the plurality of stations;
a plurality of movable covers at least partially concealing the open end of the interior region, each movable cover being positioned to provide access to one station of the plurality of stations;
a heating means positioned beneath the floor to deliver heat into the interior region for heating to a predetermined temperature all of the stations at the same time including the laboratory slides accommodated at those stations; and
a fan for circulating heated air within the interior region to heat the laboratory slides.

2. The laboratory slide heater of claim 1, wherein the movable covers are positioned over respective stations.

3. The laboratory slide heater of claim 1, further comprising a computer processor and a user interface disposed on the housing for inputting instructions to the computer processor.

4. The laboratory slide heater of claim 3, wherein the computer processor is configured to operate a different timer for each station.

5. The laboratory slide heater of claim 4, wherein, once a timer for one of the stations has elapsed, the processor is configured to visually and/or audibly alert the user.

6. The laboratory slide heater of claim 5, wherein each station includes a visual indicator for (i) indicating that a timer for one of the stations has elapsed, (ii) indicating that heating is underway in said one station, and (iii) indicating that said one station is ready to be populated with a carriage.

7. The laboratory slide heater of claim 4, wherein, after the time for one of the stations has elapsed, the processor continues to operate the heating means.

8. The laboratory slide heater of claim 1, wherein each movable cover is a removable cover that is removably mounted to the housing.

9. The laboratory slide heater of claim 1, wherein each movable cover is a door that is movably mounted to the housing.

10. The laboratory slide heater of claim 1, wherein a plurality of depressions are disposed on the floor, and wherein each depression is associated with one of the stations.

11. The laboratory slide heater of claim 10, wherein each carriage carrier is positioned at least partially within one of the depressions.

12. The laboratory slide heater of claim 1, wherein the plurality of moveable covers are arranged in either one row or a plurality of rows.

13. The laboratory slide heater of claim 1 further comprising a sensor for detecting either a presence or absence of one of the movable covers, wherein the presence of said one of the movable covers indicates that said one of the movable covers is covering the open end of the interior region, and the absence of said one of the movable covers indicates that said one of the movable covers is not covering the open end of the interior region.

14. The laboratory slide heater of claim 13 further comprising a plurality of the sensors, each sensor configured for detecting either the presence or absence of one of the respective movable covers.

15. The laboratory slide heater of claim 1 further comprising removable trays, each removable tray being positioned at a bottom of one of the respective carriage carriers.

16. The laboratory slide heater of claim 1, wherein the plurality of stations are arranged in either discrete rows or a circular arrangement.

17. The laboratory slide heater of claim 1, wherein the moveable cover includes a hollow region that is configured to accommodate a carriage that is positioned within one of the carriage carriers.

18. The laboratory slide heater of claim 17, wherein the moveable cover protrudes outside of the interior region of the housing.

19. A laboratory slide heater comprising:

a housing defining an interior region;

a platform positioned within the interior region and defining a plurality of stations arranged in a circular fashion;

a plurality of independent carriage carriers each having an open frame for holding a plurality of laboratory slides in a vertical orientation, each carriage carrier being independently accommodated in one station of the plurality of stations;

a motor that is configured to rotate the platform for removing liquid from the slides;

a heating means positioned beneath the platform to deliver heat into the interior region for heating to a predetermined temperature all of the stations at the same time including the one or more laboratory slides accommodated at those stations; and a fan for circulating heated air within the interior region to heat the one or more laboratory slides.

\* \* \* \* \*